United States Patent [19]

Mori et al.

[11] Patent Number: 5,341,504
[45] Date of Patent: Aug. 23, 1994

[54] MULTI-DIMENSIONAL STRUCTURED COMPUTER SYSTEM

[75] Inventors: Kinji Mori, Yokohama; Shoji Miyamoto, Kawasaki; Hirokazu Ihara, Machida, all of Japan

[73] Assignee: Hitachi, Ltd., Tokyo, Japan

[21] Appl. No.: 490,520

[22] Filed: Mar. 1, 1990

Related U.S. Application Data

[62] Division of Ser. No. 182,218, Apr. 15, 1988, abandoned, which is a division of Ser. No. 687,245, Dec. 28, 1984, abandoned.

[30] Foreign Application Priority Data

Dec. 28, 1983 [JP] Japan ................. 58-246294

[51] Int. Cl.$^5$ .............................................. G06F 13/00
[52] U.S. Cl. ....................... 395/800; 364/DIG. 1; 364/229; 364/229.3; 364/229.4; 364/240; 364/240.4; 364/242.94; 364/284; 364/284.3; 364/284.4; 370/16.1; 370/85.15; 370/85.12; 371/11.2; 371/20.6; 340/825.05
[58] Field of Search ............... 364/200, 900; 395/800, 395/200, 325; 370/16.1, 85.5, 85.12, 85.14, 85.15, 88; 371/20.6, 11, 22, 16, 11.2; 340/825.05, 827

[56] References Cited

U.S. PATENT DOCUMENTS

| | | | |
|---|---|---|---|
| Re. 33,521 | 1/1991 | Mori et al. | 370/85.15 X |
| 3,473,160 | 10/1969 | Wahlstrom | 395/800 |
| 3,731,002 | 5/1973 | Pierce | 370/85.14 |
| 4,048,446 | 9/1977 | Hafner et al. | 370/16 |
| 4,159,470 | 6/1979 | Strojny et al. | 371/11 X |
| 4,177,514 | 12/1979 | Rupp | 395/800 |
| 4,195,351 | 3/1980 | Barner et al. | 370/86 X |
| 4,247,892 | 1/1981 | Lawrence | 395/800 |
| 4,271,511 | 6/1981 | Manber et al. | 370/16 X |
| 4,276,643 | 6/1981 | Larrie et al. | 370/16 X |
| 4,287,592 | 9/1981 | Paulish et al. | 370/88 |
| 4,354,267 | 10/1982 | Mori et al. | 371/11 |
| 4,399,531 | 8/1983 | Grande et al. | 370/94 X |
| 4,527,270 | 7/1985 | Sweeton | 371/11 |
| 4,538,264 | 8/1985 | Bahr et al. | 371/11 X |
| 4,561,088 | 12/1985 | Champlin et al. | 370/16 |
| 4,594,709 | 6/1986 | Yasue | 371/11 X |
| 4,622,632 | 11/1986 | Tanimoto et al. | 364/200 |
| 4,644,496 | 2/1987 | Andrews | 364/900 |
| 4,686,330 | 8/1987 | Hourton | 370/88 X |
| 4,709,327 | 11/1987 | Hillis et al. | 364/200 |
| 4,872,165 | 10/1989 | Mori et al. | 371/11.2 |

FOREIGN PATENT DOCUMENTS 54-39503  3/1979  Japan .

OTHER PUBLICATIONS

Wittie, Larry D., "Communication Structures for Large Networks of Microcomputers", IEEE Transactions on Computers, vol. C-30, No. 4, Apr. 1981, pp. 264-273.

(List continued on next page.)

*Primary Examiner*—Paul V. Kulik
*Attorney, Agent, or Firm*—Antonelli, Terry, Stout & Kraus

[57] ABSTRACT

A plurality of processors have a plurality pairs of input ports and output ports, and are constituted in a looped manner by connecting the output ports and the input ports of the same pairs of any number of processors. A transmission system is formed in which the data on the same loop is allowed to flow and the data that is required is transferred to different loops, so that the data flows through the loops and across the loops to reach a predetermined processor. The system is formed of a first group of looped transmission lines, a second group of looped transmission lines that are arranged to intersect said first group of looped transmission lines, transmission lines that couple said intersecting transmission lines together, and a data processing and controlling unit that controls the transmission of data among the transmission lines and that processes the data.

28 Claims, 10 Drawing Sheets

OTHER PUBLICATIONS

Feng, Tse-yun, "A Survey of Interconnection Networks," Computer, IEEE, Dec. 1981, pp. 5–20.

Snyder, Lawrence, "Introduction to the Configurable, Highly Parallel Computer," Computer, IEEE, Jan. 1982, pp. 47–56.

Ihara, Hirokazu et al., "Highly Reliable Loop Computer Network System Based On Autonomous Decentralization Concept," FTCS 12th Annual International Symposium Fault.

Tolerant Computing, IEEE, Jun. 22–24, 1982; pp. 187–194.

Mori, Kinji et al., "Autonomous Decentralized Loop Network," 24th IEEE Computer Society International Conference Compcon 82, Feb. 22–25, 1982; pp. 192–195.

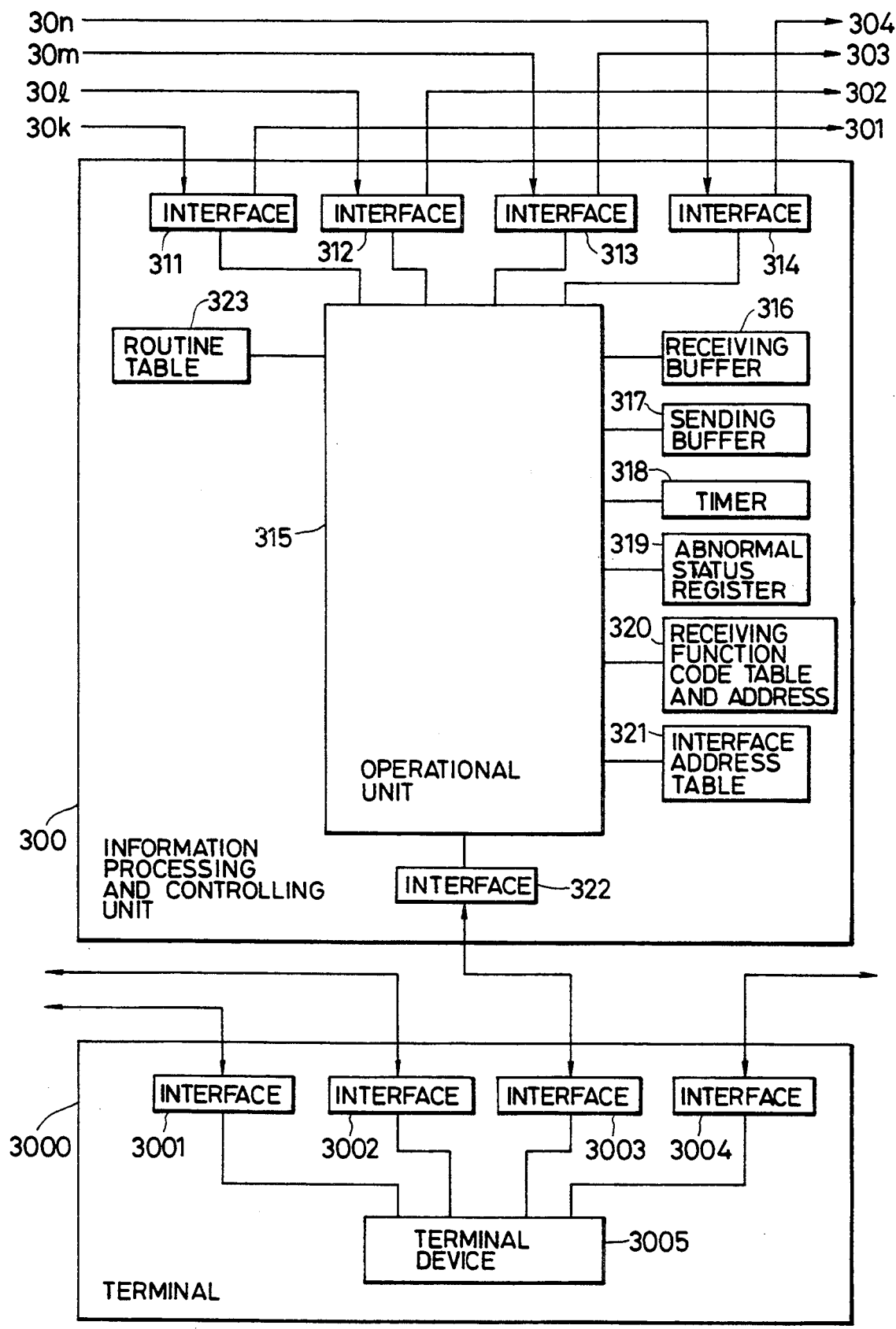

MULTI-DIMENSIONAL STRUCTURED COMPUTER SYSTEM

This application is a divisional of application Ser. No. 182,218, filed Apr. 15, 1988, now abandoned which is a divisional of Ser. No. 687,245, filed Dec. 28, 1984, now abandoned.

BACKGROUND OF THE INVENTION

1. Field of the Invention

The present invention relates to a combination of processors that have a uniform transmission processing function, and more specifically to a combined computer system that is constituted in a one-dimensional to three-dimensional manner.

2. Description of the Prior Art

Network systems for connecting a plurality of processors (computers) have heretofore been either a bus structure, a loop structure, a star structure, and a mesh structure. The first three of these structures can not be constructed in a three-dimensional configuration. In a mesh structure in which processors are connected through bidirectional transmission lines, routing is complex. In a star structure, the processor at the center of the structure is different from the other processors. In a mesh structure, a particular processor must work to cope with any change in the structure of the system or with any abnormal condition that may occur, thereby making it difficult to expand and maintain the system.

SUMMARY OF THE INVENTION

To preclude the defects inherent in the conventional art, the present invention provides a method for constituting processors that serve as constituent units of a system in which very uniform constituent units are connected through a plurality of looped transmission lines, which can be constructed in two-dimensional and three-dimensional configurations, and to which a simply constructed transmission system can be adapted.

For this purpose, the present invention deals with a structure which comprises a first group of looped transmission lines consisting of a plurality of looped transmission lines, a second group of looped transmission lines that consist of at least one looped transmission line and that are arranged to intersect said first group of looped transmission lines, transmission lines that couple said intersecting transmission lines together, and data processing and controlling means that control the transmission of data along the transmission lines and that process the data, and wherein, as required, the number of building blocks is increased or decreased for each of the looped transmission lines.

BRIEF DESCRIPTION OF THE DRAWINGS

FIG. 14 is a schematic diagram of a data processing and controlling unit according to the present invention.

DESCRIPTION OF THE PREFERRED EMBODIMENTS

Figure 1A:
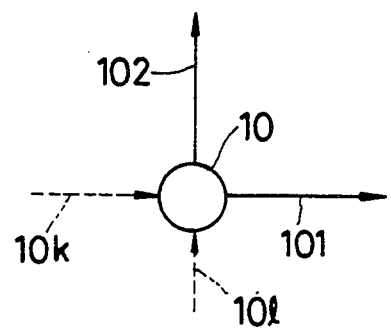
FIGS. 1(a), 1(b) and 1(c) are diagrams of constituent processor units as employed by the present invention.
Figure 1B:
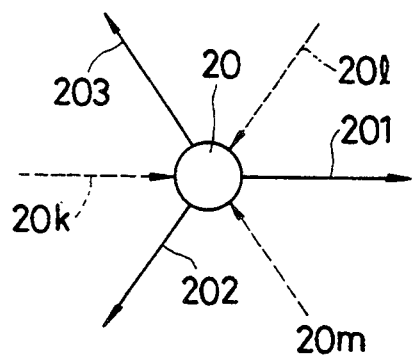
Figure 1C:
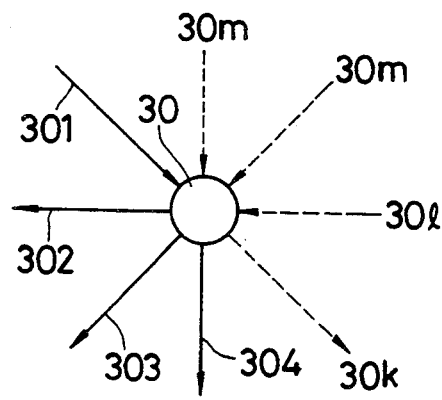

Three kinds of constituent elements as shown in FIGS. 1(a), 1(b) and 1(c) may be combined in the form of building blocks to constitute a system. The constituent unit consists of a processor and unidirectional transmission lines for transmitting data therefrom to other processors. Transmission lines of neighboring processors are connected to the unidirectional transmission lines so as to form pairs and so as to receive to data therefrom. The constituent units shown in FIGS. 1(a), 1(b) and 1(c) consist of processors 10, 20 and 30, and two, three and four transmission lines (101, 102), (201, 202, 203), and (301, 302, 303, 304), respectively. To the transmission lines 101, 102, 201, 202, 203, 301, 302, 303 and 304 are connected transmission lines 10k, 10l, 20k, 20l, 20m, 30k, 30l, 30m and 30n of the neighboring processors to form processor pairs. FIGS. 2 to 13 show transmission lines of the processors forming pairs, that are connected successively. The constituent units are all the same, hence, each of the transmission lines constitutes a portion of a closed loop transmission line. Here, the constituent unit may have any number of unidirectional transmission lines in addition to the above-mentioned numbers.

Figure 2:
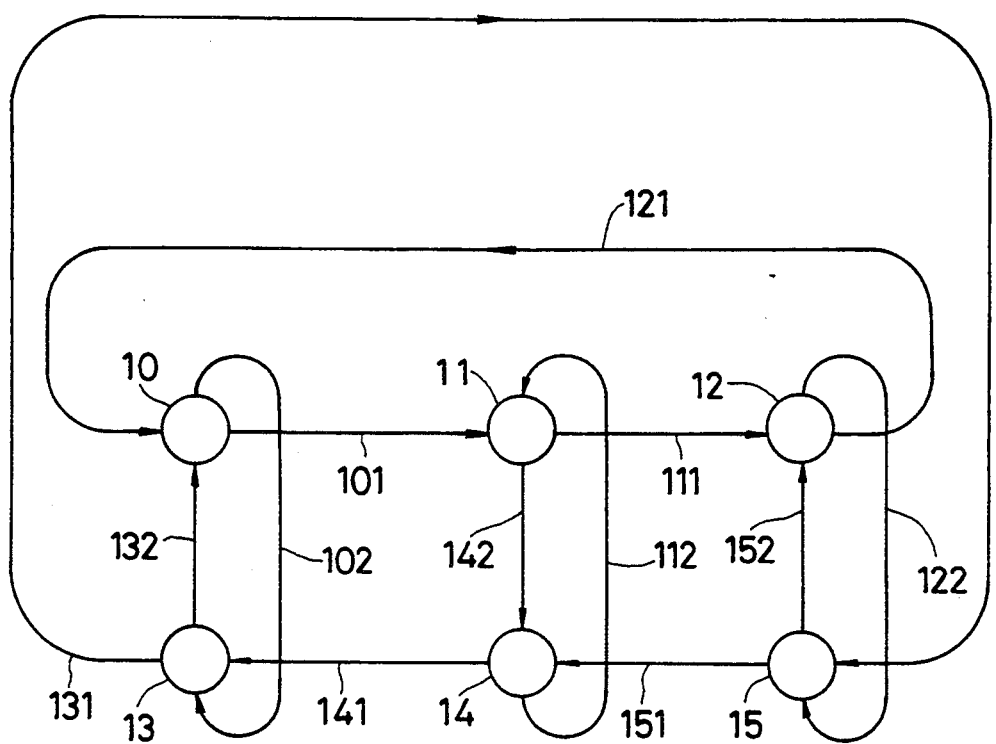
FIG. 2 is a diagram showing the connection of a plurality of processor units in the form of a network.

FIGS. 2 to 5 illustrate examples of connecting the constituent units that have two unidirectional transmission lines. Namely, FIG. 2 illustrates an example in which the processors are divided into two groups consisting of (10, 11, 12) and (13, 14, 15) which are coupled through a loop (101, 111, 121) and a loop (131, 151, 141). The processors (10, 13), (11, 14) and (12, 15) on these different loops are coupled via a loop (102, 132), a loop (112, 142) and a loop (122, 152).

Figure 3:
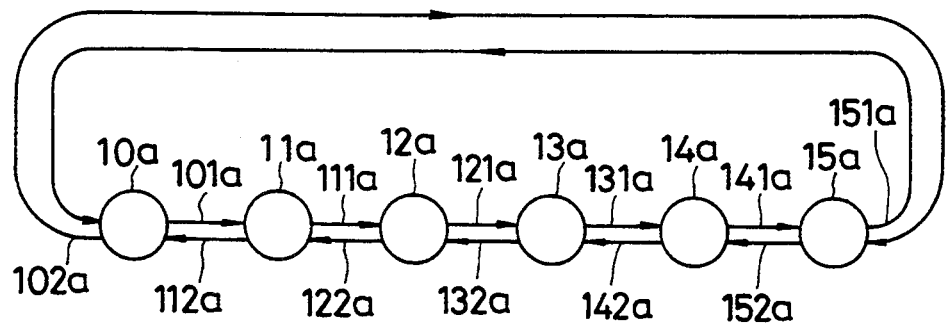
FIG. 3 is a diagram showing a plurality of processor units connected in a different form of network.

FIG. 3 shows an example in which all of the processors are coupled through the same loops.

Figure 4:
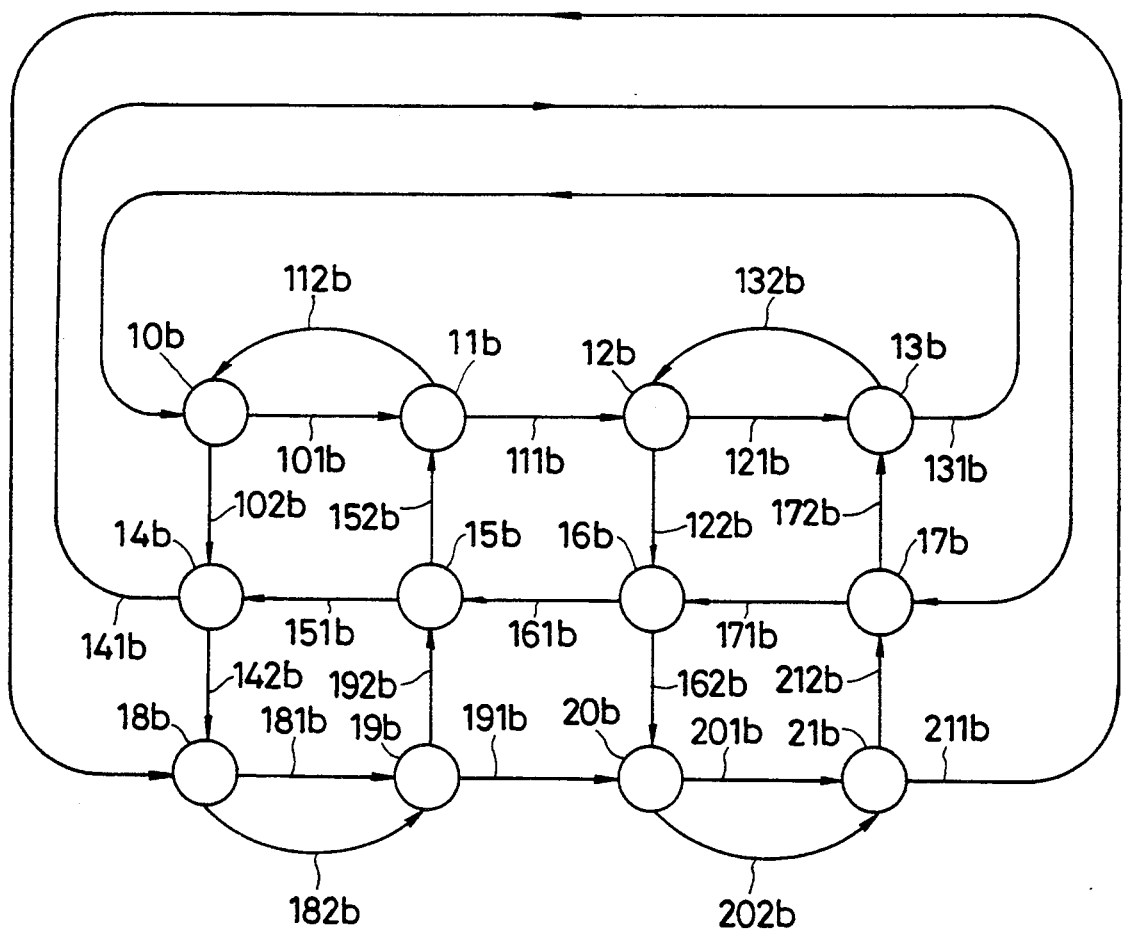
FIG. 4 is a diagram showing a plurality of processor units connected in another form of network.

FIG. 4 illustrates an example in which the processors are divided into three groups (10b, 11b, 12b, 13b), (14b, 15b, 16b, 17b) and (18b, 19b, 20b, 21b) which are coupled in the form of loops. Unlike the example of FIG. 2, however, processors (10b, 11b), (12b, 13b), (18b, 19b) and (20b, 21b) on the same loops are coupled. In this regard, the example of FIG. 4 resembles the example of FIG. 3. However, other processors (14b, 15b, 16b, 17b) are connected to constitute loops that traverse the above-mentioned three loops (101b to 131b), (141b to 151b) and (181b to 211b). In this regard, the example of FIG. 4 is the same as the connection method of FIG. 2.

Figure 5:
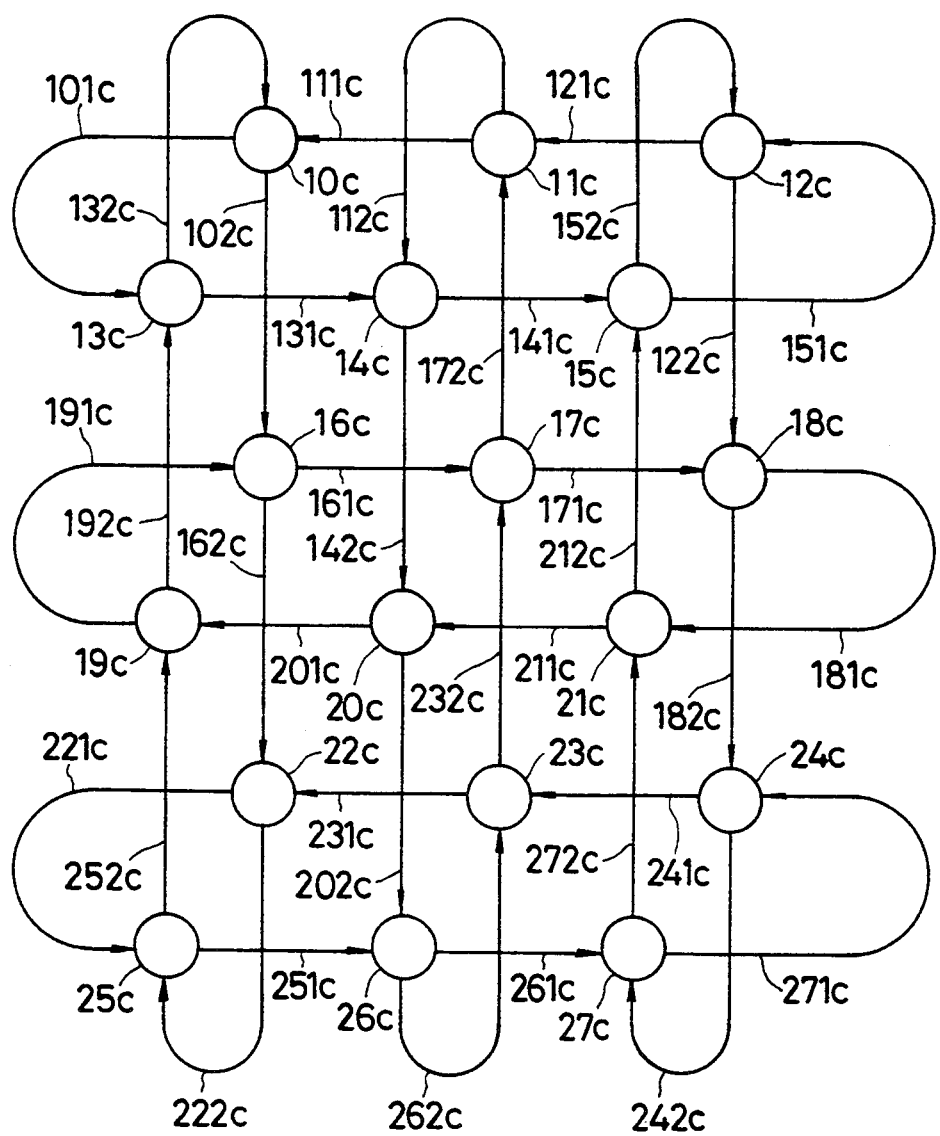
FIG. 5 is a diagram showing a plurality of processor units connected in another form of network.

FIG. 5 shows an example in which processors are divided into three groups (10c, 11c, 12c, 13c, 14c, 15c), (16c, 17c, 18c, 19c, 20c, 21c) and (22c, 23c, 24c, 25c, 26c, 27c) which are coupled in the form of loops. Unlike the example of FIG. 4, however, the processors 11c, 14c and the processors 23c, 26c exist on the loops (101c to 121c), (221c to 231c) and are not adjacent to each other.

In the arrangement of FIG. 2, if the system is to be expanded without changing the constitution of the double loop consisting of a loop (101, 111, 121) and a loop (131, 151, 141), it is necessary to increment the number of processors by one for each of these loops. Hence, it is necessary to increase the number of processors by two. If it is based on loops (102, 131), (112, 142) and (122, 152), the processors can be incremented by one for each of the loops. That is, the processors can be increased by a total of three.

In the arrangement of FIG. 3 based upon a double loop structure, the processors can be incremented by a unit of one. Based upon the same idea as that of FIG. 2, the processors in the arrangement of FIG. 4 can be increased by a unit of six or by a unit of four. In the arrangement of FIG. 5, in the same manner, the processors can be increased by a unit of six processors. Increase in the number of processors changes the structure of system. Therefore, the number of processors to be increased may change thereafter.

Figure 6:
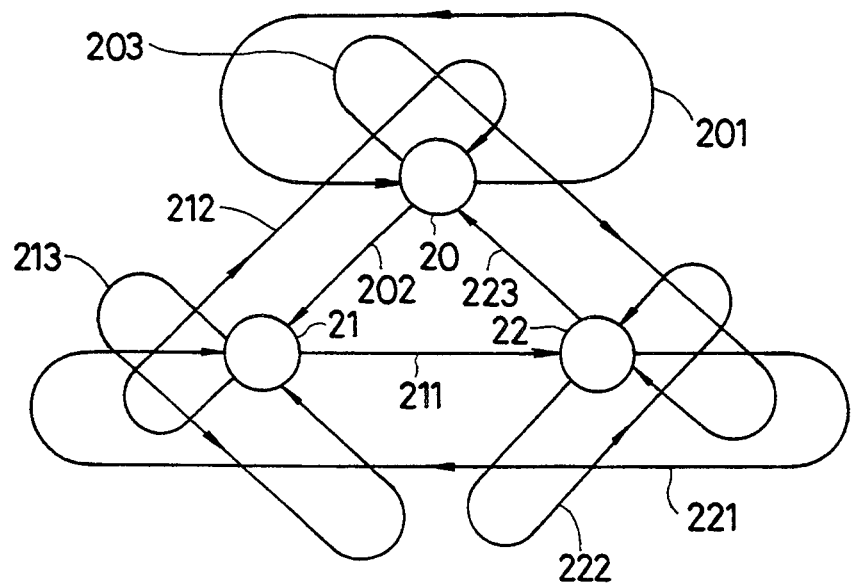
FIG. 6 is a diagram showing a plurality of processor units connected in another form of network.

FIGS. 6 to 10 illustrate methods for connecting constituent units that have three unidirectional transmission lines. In FIG. 6, the three processors 20, 21 and 22 are connected by loops (202, 212), (211, 221), (203, 223) that connect between the two processors, and by loops 201, 213, 222 of single processors.

Figure 7:
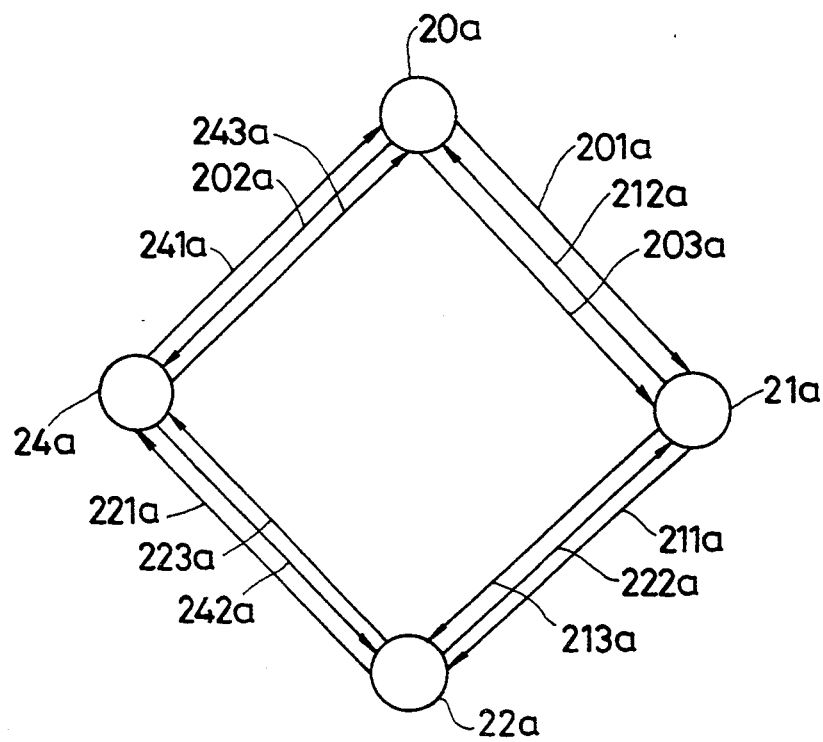
FIG. 7 is a diagram showing a plurality of processor units connected in another form of network.

In FIG. 7, the four processors are connected by triple loops.

Figure 8:
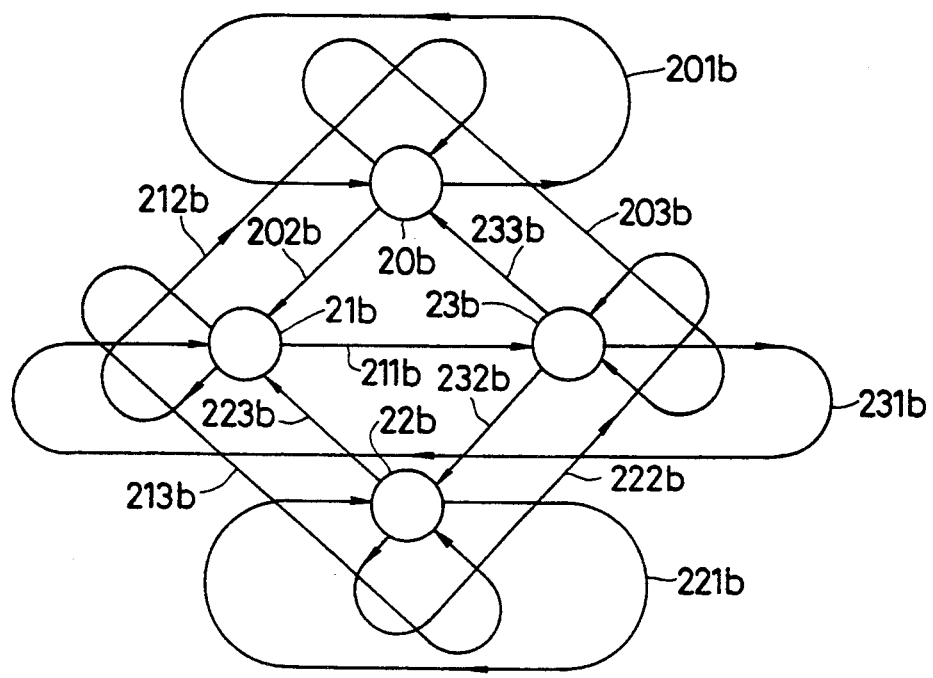
FIG. 8 is a diagram showing a plurality of processor units connected in another form of network.
Figure 9:
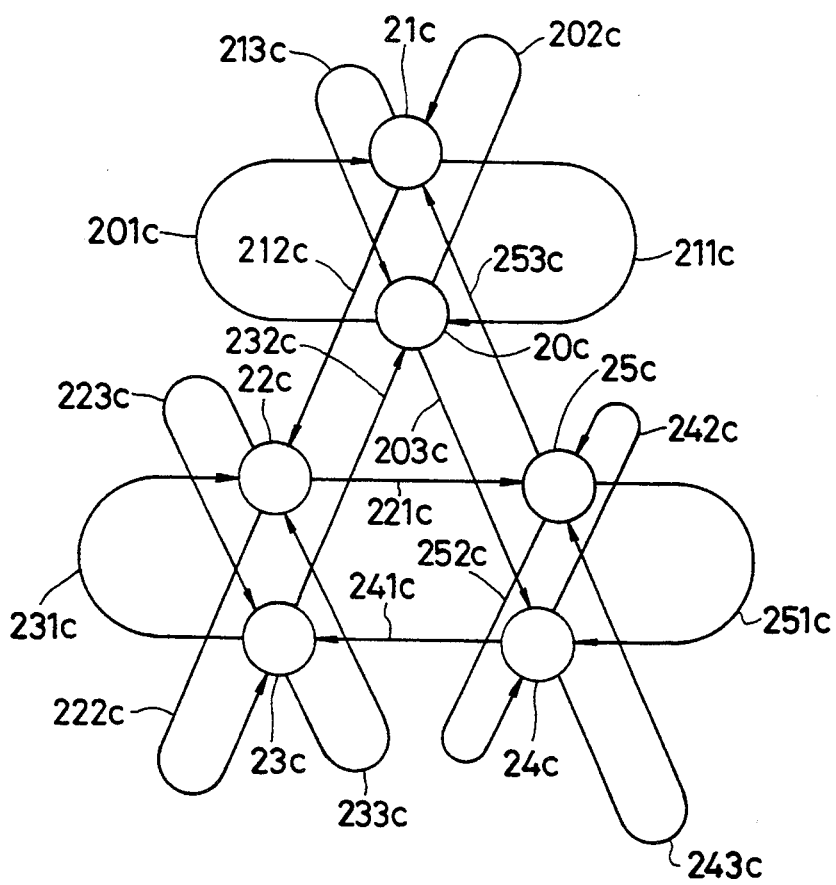
FIG. 9 shows a plurality of processor units connected in another form of network.
Figure 10:
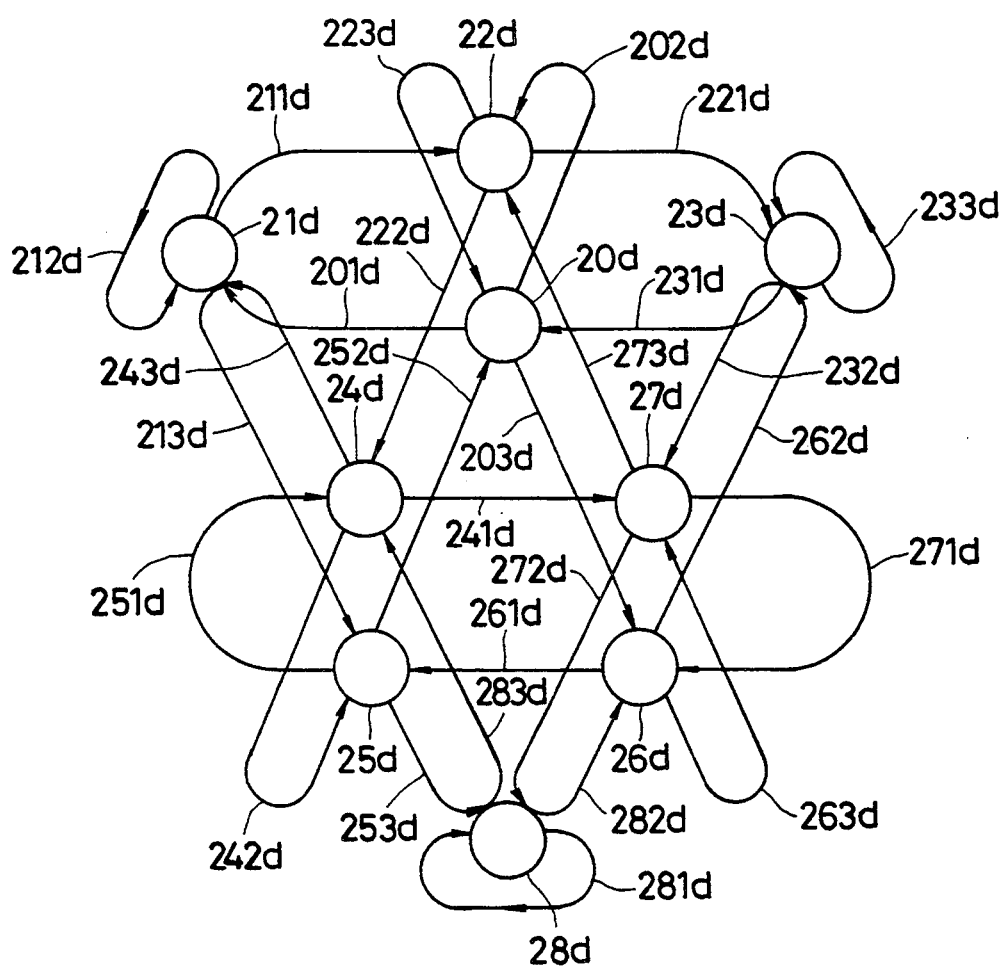
FIG. 10 shows a plurality of processor units connected in another form of network.

FIG. 8 shows an example in which a processor is added to the structure of FIG. 6. FIG. 9 shows an example in which three processors are added to the structure of FIG. 6. FIG. 10 illustrates an example in which three processors are added to the structure of FIG. 9. In the structures of FIGS. 7 to 10, the processors can be incremented by any integer greater than one.

Figure 11:
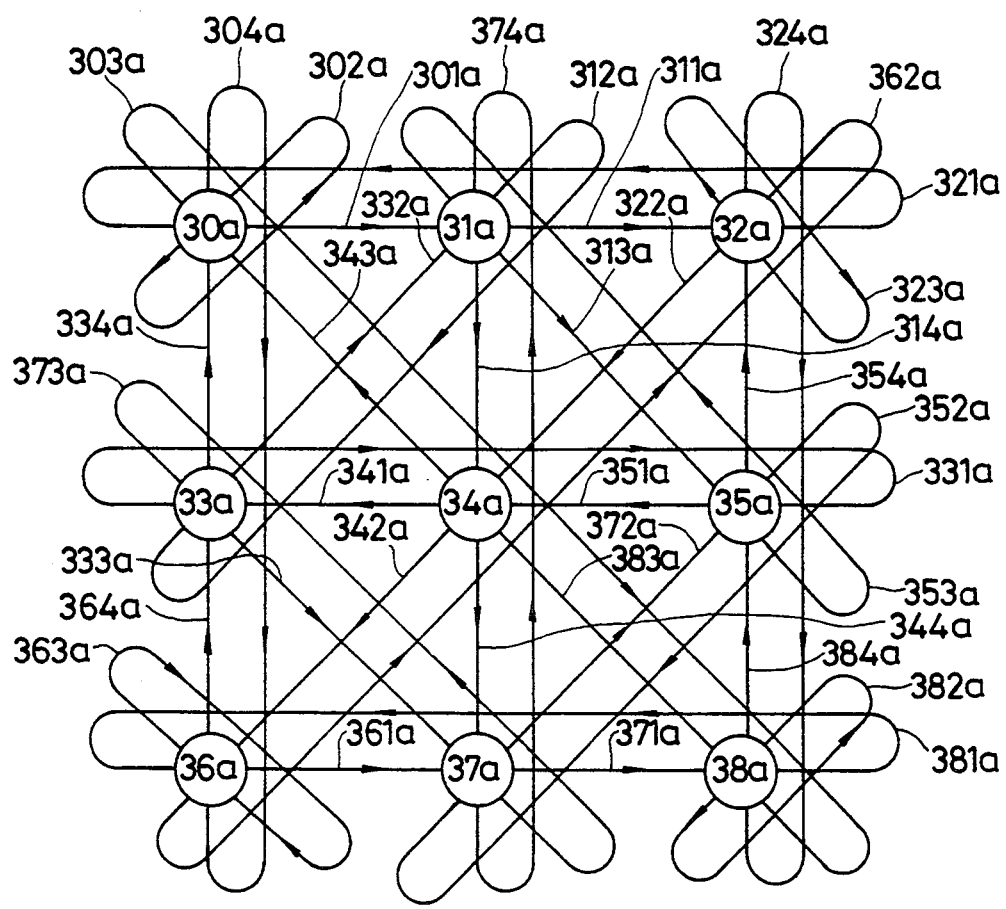
FIG. 11 shows a plurality of processor units connected in another form of network.
Figure 12:
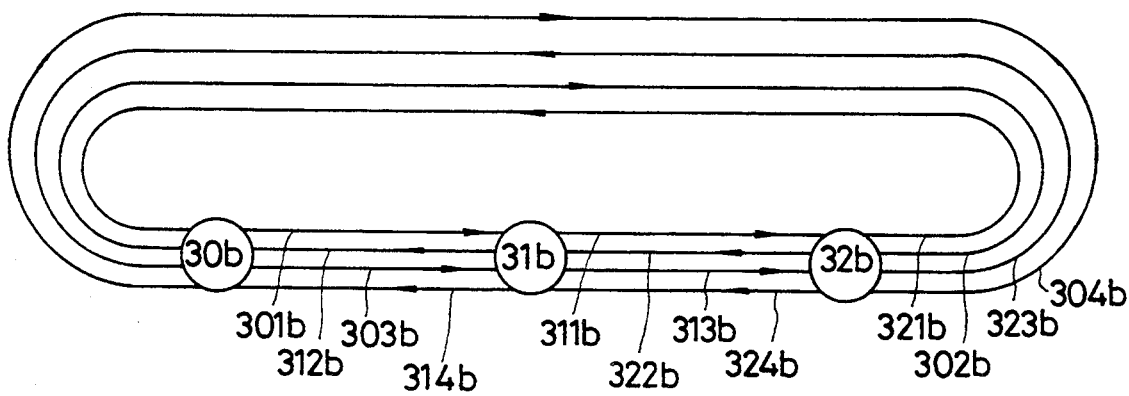
FIG. 12 shows a plurality of processor units connected in another form of network.
Figure 13:
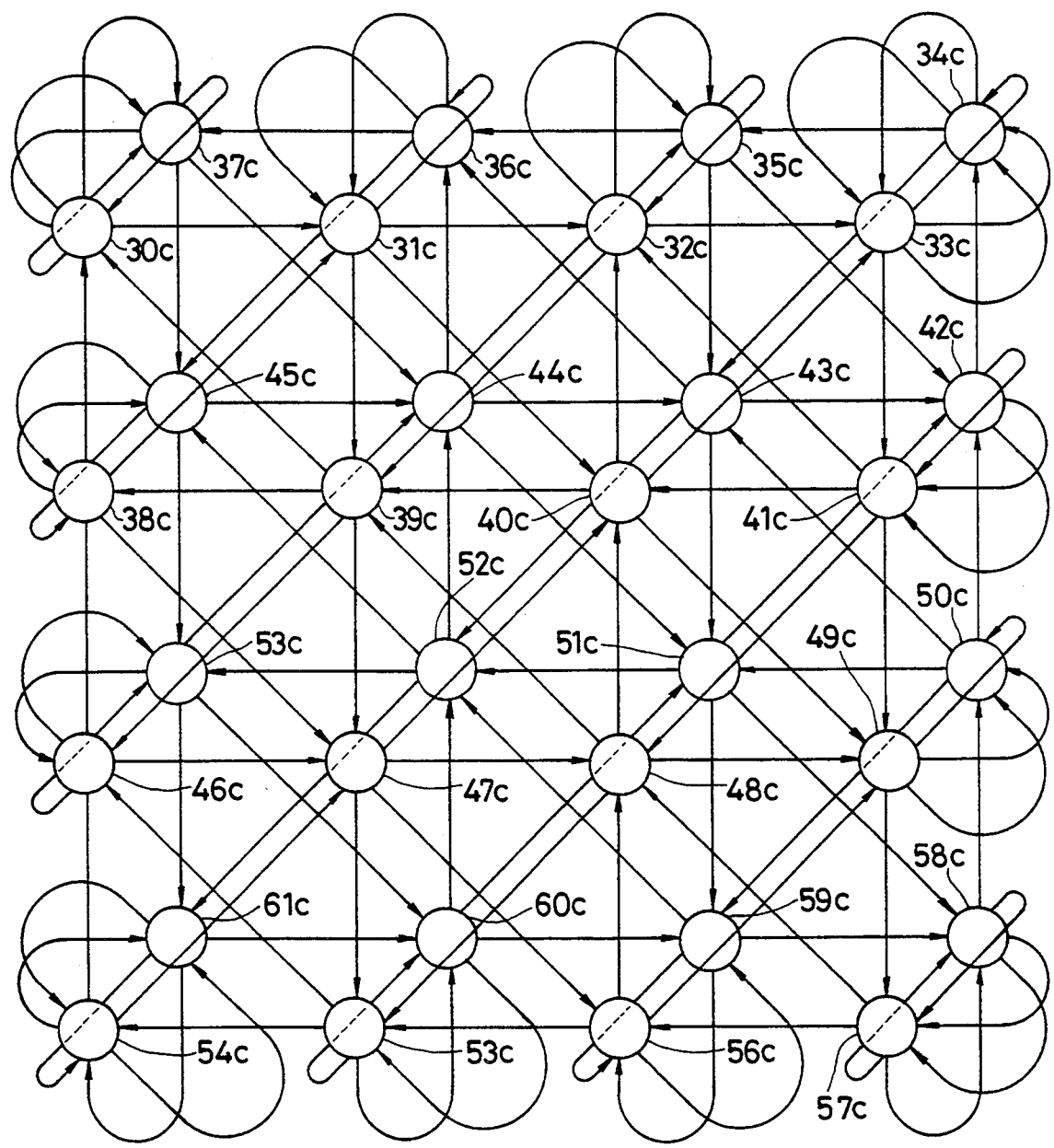
FIG. 13 is a diagram showing a plurality of processor units connected in another form of network.

FIGS. 11 to 13 illustrate methods of connecting constituent units that have four unidirectional transmission lines. FIG. 11 shows an example in which nine processors are arranged in a two-dimensional manner, FIG. 12 shows an example in which three processors are arranged in a one-dimensional configuration, and FIG. 13 shows an example in which 32 processors are arranged in a three-dimensional configuration. FIG. 13 is an expansion of the structure of FIG. 11.

FIG. 14 shows the internal structure of the constituent units 10, 20 and 30. Responsive to the numbers 2, 3, 4 of unidirectional transmission lines of the constituent units 10, 20 and 30, however, there exist two, three or four interfaces connected to the loop transmission lines. The processor consists of a terminal 3000 and a data processing and controlling unit 300 which controls the transmission or reception of information relative to the loop transmission lines.

The terminal 3000 consists of a terminal device 3005 and interfaces 3001 to 3004 between the terminal device and the data processing and controlling unit. Here, the four interfaces 3001 to 3004 make connection with different data processing and controlling units, and may be provided in any number greater than one.

Described below is a process in which data generated from the terminal device 3005 is transmitted to a predetermined terminal via a loop transmission line.

Data generated from the terminal device 3005 is sent to data processing and controlling units via interfaces 3001 to 3004. Data sent from the terminal device via an interface 322 is then stored in a sending buffer 317. Data is provided with an address (receiving address) of a terminal where the data will be received or a code (content code) corresponding to the content of the data. In a routine table 323 a program has been written which determines in which loop direction the data should be transmitted corresponding to the address or the content code. The program has been written onto the routine table 323 prior to sending the data. When data exists in the sending buffer 317, the operational unit 315 sends that data from any one of the interfaces 311 to 314 relying upon the routine table 323. If the data thus sent returns after having circulated through the loop, the operational unit 315 judges that the data is properly transmitted, and erases the data from the sending buffer 317. Here, the data that is to be sent is provided with an address of the interface that sends the data. The address of the interface has been stored beforehand in the ROM of interface address table 321.

When data arrives on the loop, the data processing and controlling unit 300 introduces the data through, for example, an interface 311, reads the address of the interface 311 from the interface address table 321, attaches the interface address, and stores the data in a receiving buffer 316. If the data received is not the data that is generated from the data processing and controlling unit 300, the data is then sent through the interface 311 that has received the data. If the data is the data that is generated from the data processing and controlling unit 300, that data is erased from the receiving buffer 316 and from the sending buffer 317 as mentioned above.

As the data is taken into the receiving buffer 316, the operational unit 315 transfers the data to the terminal via the interface 322 provided the receiving address or the content code of the data is in agreement with that of a receiving function code table and address 320. Next, if the receiving address or the content code of the data is in agreement with that in the routine table 323, said data is sent in the direction of the transmission loop written thereon through interfaces 311 to 314 of directions other than the loop direction in which the data is received. When the data is sent to the terminal and to the loop direction, the data is erased from the receiving buffer 316.

When the data in the sending buffer 317 and the data in the receiving buffer 316 are to be sent for the first time, each on its own loop, the data processing and controlling unit sets the timer 318 for each of the data. If the data does not return even after a predetermined period of time has passed, the data processing and controlling unit sets the flag of an abnormal status register 319 corresponding to the loop into which the data is sent.

As the flag is set in the abnormal status register 319, the operational unit 315 broadcasts the abnormal condition on the loop in all directions via the interfaces 311 to 314. Upon receipt of the data which reports the abnormal condition, the data processing and controlling units broadcast the abnormal condition to the loop directions in which the data reporting the abnormal condition has not yet been received. The processor which has received the data that reports the abnormal condition converts the routine table 323 corresponding to the abnormal loop. For instance, a by-pass route may have been determined to cope with the abnormal condition that may take place in the loops, or if an abnormal condition develops somewhere, the data may be broadcast in all loop directions thereafter.

In the receiving function code table and address unit 320 there has been stored in advance a content code or an address of the data required by the terminal device 3005 that is connected to the data processing and controlling unit 300.

According to the system of the present invention, the defective portion may be separated to be checked. In this case, transmission of data is continued through other portions. Further, since the constituent units are all the same, maintenance can be easily carried out.

According to the present invention as described above, identical constituent units are successively connected to each other to form a plurality of looped structures. By changing the method of connection, a communication network can be constituted that can be easily changed into a one-dimensional, two-dimensional or three-dimensional structure. Further since it is based upon a looped network, transmission routing can be easily accomplished. Moreover, all of the constituent units have the same hardware and software, and no apparatus having particular functions such as a master apparatus is needed, thereby offering an advantage in regard to maintenance.

What is claimed is:

1. A three-dimensional structured computer system comprising:
   a plurality of processors each having a plural number of inputs and a plural number of outputs;
   at least a first transmission loop line; and
   at least one second transmission line being connected to said first transmission loop line at least through two processors connected in common in said first transmission loop line and the second transmission line, said second transmission line having at least one other processor connected therein which is not connected in said first transmission loop line,
   each of said processors having means for relaying data from one of said inputs thereof to at least one of said outputs thereof, each of said inputs of said processors being connected to one of said first and second transmission lines and each of said outputs being connected to one of said first and second transmission lines, and each of said processors further having means for independently determining, by use of a routine table stored in said each of said processors, said at lest one output to which to relay said data from said one of said inputs based upon content of the data to be relayed, without instruction from another processor, and for controlling said relay of data according to the determination, thereby forming an independently routed network.

2. A three-dimensional structured computer system in accordance with claim 1 wherein each of said inputs has an output specifically paired to it to form a transmission path.

3. A three-dimensional structured computer system in accordance with claim 1 wherein at least one of said first transmission loop line or said second transmission lines are separably configured independently of other lines and structured as building block units for other lines.

4. A three-dimensional structured computer system in accordance with claim 1 wherein said second transmission lines are all identically configured.

5. A three-dimensional computer system in accordance with claim 1 wherein each of said processors contains means for autonomously initiating checking for abnormalities of the processor and/or lines of said network.

6. A three-dimensional structured computer system in accordance with claim 5 wherein each of said processors contains means for sending data to an output connected thereto, and for receiving said data through an input connected thereto, and means means responsive to its recieved data for detecting an abnormality in any loop comprising said output and said input through which said data is passed.

7. A three-dimensional computer system in accordance with claim 5 wherein said second transmission lines is configured as a loop transmission lines.

8. A three-dimensional structured computer system according to claim 5 further comprising at least one third transmission line connected to said first transmission loop line at least at two positions, through respective processors.

9. A three-dimensional structured computer system according to claim 5 wherein said determining means in each of said processors has means responsive to a detection of an abnormality by said checking for relaying data to outputs other than the output in which said abnormality is detected.

10. A three-dimensional structured computer system comprising:
    a plurality of processor units;
    at least a first transmission loop line; and
    a plurality of second transmission lines each connected to said first transmission loop line at least through two processor units in common, and connected to another processor unit which is not connected to said first transmission loop line; and
    each of said processor units having a plurality of inputs and a plurality of outputs and having means for relaying data from one of said inputs to at least one of said outputs, each of said inputs of said processor units in common being connected to one of said first and second transmission lines and each of said outputs being connected to one of said first and second transmission lines to form a processor unit network;
    wherein each of said processor units further contains means for independently checking line status of the lines connecting processor units of said network without control from any other processor units at any time, and means for independently controlling, by use of a routine table stored in said each of said processor units, selection of an output to which data is to be relayed from said one of said inputs according to the result of said checking based upon content of the data to be relayed.

11. A three-dimensional structured computer system in accordance with claim 10, wherein:
    each of said processor units contains means for sending data to an output connected thereto independent of the timing and control of all other processor units and for receiving said data through an input connected thereto, thereby forming an independently routed data transmission loop, and means for detecting an abnormality in line status of any data transmission loop comprising an output and an input through which data is passed by said sending means.

12. A three-dimensional computer system in accordance with claim 10, wherein:

each of said plurality of each transmission lines are configured as loop lines.

13. A three-dimensional structured computer system according to claim 10, further comprising:
at least one third transmission line connected to said first transmission loop line at least at two positions, through respective processor units.

14. A three-dimensional structured computer system according to claim 10, wherein:
each of said processor units has means responsive to detection of an abnormality in line status of a transmission path from an output for transmitting data to an output other than the output in which said line status abnormality is detected.

15. A three-dimensional structured computer system according to claim 10, transmission loop line; and
wherein every processor has the same number of inputs and the same number of outputs.

16. A three-dimensional structured computer system in accordance with claim 15, wherein each of said inputs of each processor unit has an output specifically paired to it.

17. A three-dimensional structured computer system in accordance with claim 15, wherein at least one of said first transmission loop line and said second transmission lines are configured as building block units for other loop lines.

18. A three-dimensional structured computer system in accordance with claim 15, wherein said second transmission lines are all of the same configuration.

19. A three-dimensional structured computer system, comprising:
a plurality of processors each having at least three inputs and three outputs; and
at least first, second and third groups of transmission lines, each input of each processor being connected to a transmission line of a respective one of said first, second and third groups of transmission lines, and each output of each processor being connected to a single transmission line of a respective one of said first, second and third groups of transmission lines, each processor being connected to only a single transmission line of each respective group to which that processor is connected;
each of said processors having control means for independently determining the status of lines connected to the processor and for controlling, by use of a routine table stored in said each of said processors, a relaying of data from one of said inputs to at least a selected one of said outputs thereof based upon content of the data to be relayed, without instruction from another processor, according to the determined line status, thereby forming an independently routed network.

20. A three-dimensional structured computer system according to claim 19, wherein at least one of said first, second and third groups of transmission lines comprise loop transmission lines.

21. A three-dimensional structured computer system according to claim 19, wherein at least one transmission line in each of said first, second and third groups of transmission lines is a loop transmission line.

22. A three-dimensional structured computer system according to claim 19, wherein all transmission lines of said first, second and third groups of transmission lines are loop transmission lines.

23. A three-dimensional structured computer system according to claim 19, wherein said control means includes means for detecting an abnormality in line status of a transmission path from an output of the processor as an indication of said status of lines connected to the processor.

24. A three-dimensional structured computer system, comprising:
a plurality of processors each having a plural number of inputs and a plural number of outputs; and
first and second intersecting groups of transmission lines connected to said plurality of processors at cross-points thereof, at least one of said first and second groups of transmission lines including at lest three transmission lines, each processor being connected to only a single transmission line of each respective group to which that processor is connected;
each processor having a respective input and a respective output connected to a transmission line in respective ones of said first and second groups of transmission lines, and each processor having means for receiving data from one of said inputs thereof and for applying, by use of a routine table stored in said each processor, said received data to a selected one of the outputs thereof based upon content of the data to be relayed, and means for determining said selected one of the outputs independently of control by any other processor according to the status of transmission paths connected to said processor as determined solely by said processor.

25. A three-dimensional structured computer system according to claim 24, wherein at least one of said first and second groups of transmission lines comprise loop transmission lines.

26. A three-dimensional structured computer system according to claim 24, wherein at least one transmission line in each of said first and second groups of transmission lines is a loop transmission line.

27. A three-dimensional structured computer system according to claim 24, wherein all transmission lines of said first and second groups of transmission lines are loop transmission lines.

28. A three-dimensional structured computer system according to claim 24, wherein said control means includes means for detecting an abnormality in line status of a transmission path from an output of the processor as an indication of said status of lines connected to the processor.

* * * * *